Jan. 24, 1961  D. L. LORENZ ET AL  2,969,019
STRAINER CONSTRUCTION FOR A PUMP
Filed Oct. 5, 1955  3 Sheets-Sheet 2

INVENTORS
DONALD L. LORENZ
WILLIAM V. EDWARDS
BY

ATTORNEYS

Jan. 24, 1961 D. L. LORENZ ET AL 2,969,019
STRAINER CONSTRUCTION FOR A PUMP
Filed Oct. 5, 1955
3 Sheets-Sheet 3
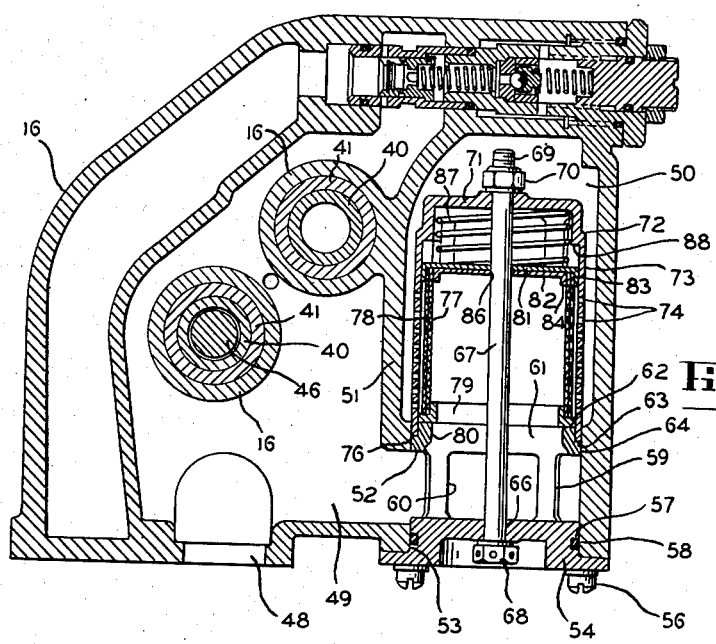
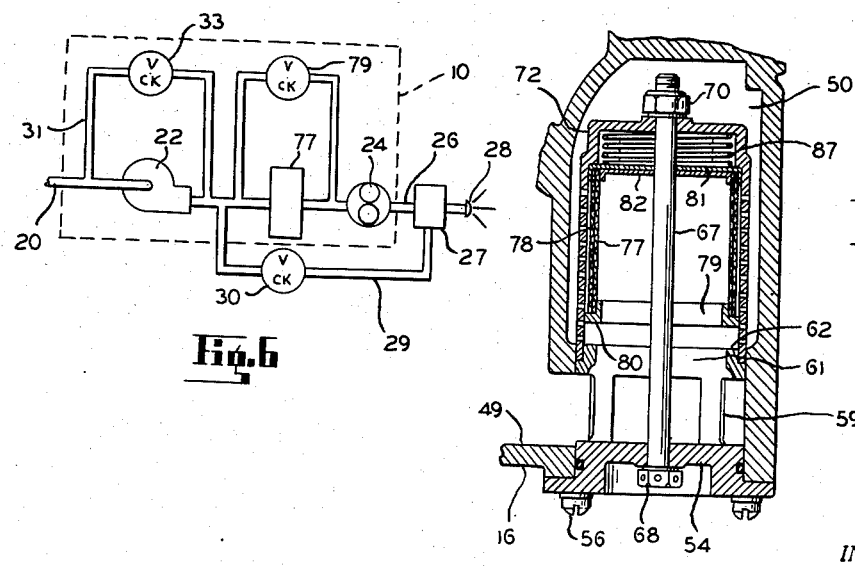
INVENTORS
DONALD L. LORENZ
WILLIAM V. EDWARDS
BY
ATTORNEYS

United States Patent Office 2,969,019
Patented Jan. 24, 1961

2,969,019

STRAINER CONSTRUCTION FOR A PUMP

Donald L. Lorenz, Euclid, and William V. Edwards, Willowick, Ohio, assignors to Thompson Ramo Wooldridge Inc., a corporation of Ohio Filed Oct. 5, 1955, Ser. No. 538,685

7 Claims. (Cl. 103—5)

This invention relates generally to aircraft fuel systems and more particularly to apparatus for pumping fuel through a fluid circuit whereby fuel is pressurized by series-staged fluid displacement means and driven through a fluid circuit extending between the inlet and outlet of an aircraft fuel pump, the fluid circuit including a strainer for filtering the fuel but operable as a valve, thereby to lift, in response to abnormal pressure forces in the fluid circuit, and insuring a continuous flow of fuel through the circuit even though the filter is clogged.

It is an object of the present invention, therefore, to provide an improved aircraft fuel pumping system.

Yet another object of the present invention is to provide a strainer construction for a pump wherein the strainer will operate as a valve in response to abnormal pressure conditions existing within the fluid circuit extending through the pump.

Yet another object of the present invention is to provide an improved method of operating a hydraulic circuit of the type utilized in an aircraft fuel pumping system embodying safety advantages to insure continuous flow of fluid through the hydraulic circuit.

Yet another object of the present invention is to provide an improved aircraft fuel pump having series-staged centrifugal and positive displacement impeller means in series-staged relation with a strainer construction interposed interstage.

Many other features, advantages and additional objects of the present invention will become manifest to those versed in the art upon making reference to the detailed description which follows and the accompanying sheets of drawings in which an aircraft fuel pump embodying the advantageous principles of the present invention are shown by way of illustrative example.

On the drawings:

Figure 4 is a cross-sectional view taken generally on line 4—4 of Figure 1 showing additional details of construction of the improved strainer apparatus provided in accordance with the principles of the present invention;

Figure 5 is a fragmentary cross-sectional view taken on the same plane as the view of Figure 4 but showing the components of the strainer apparatus positioned in a different operating location in accordance with the principles of operation of the present invention; and Figure 6 is a diagrammatic plumbing diagram illustrating the fluid circuit of the present invention.

As shown on the drawings:

Figure 1:
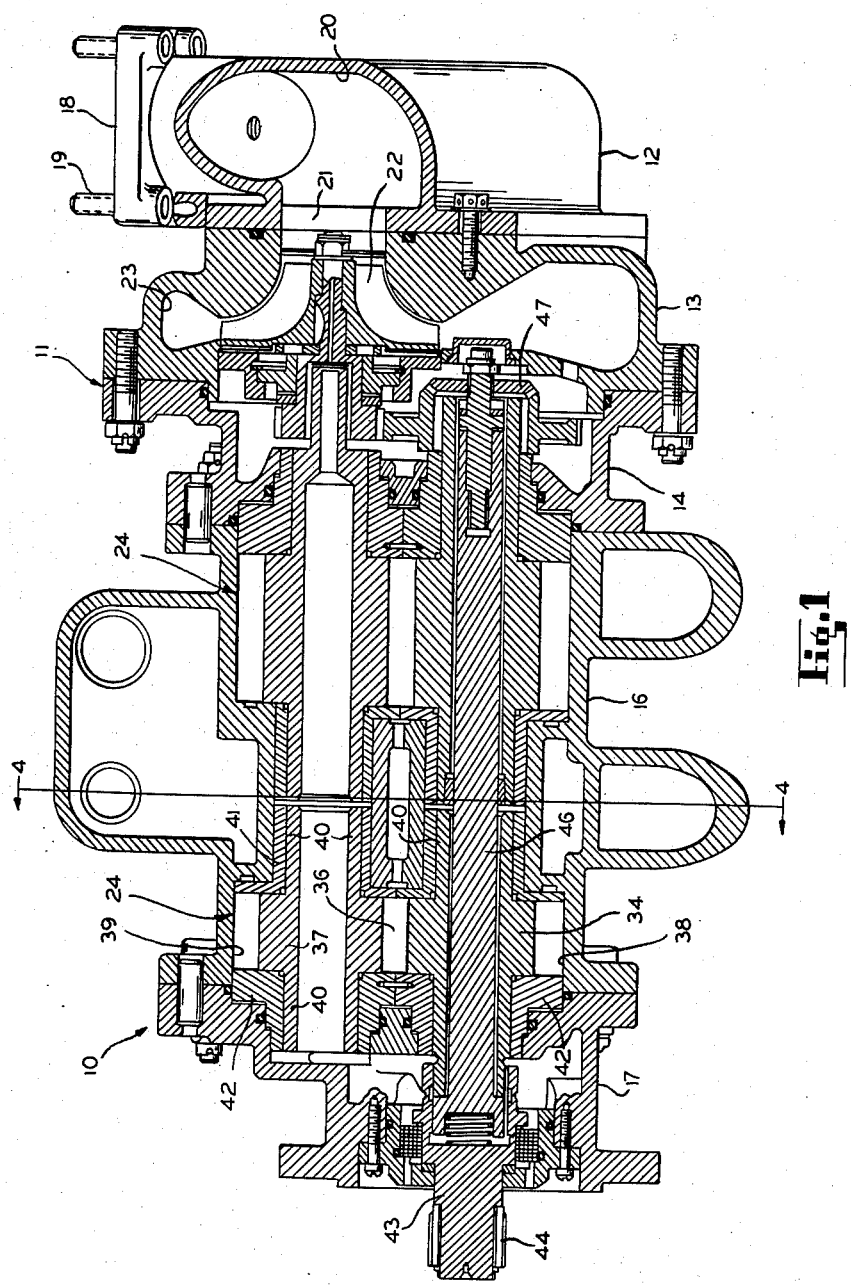
Figure 1 is a cross-sectional view of a fuel pump embodying the principles of the present invention.
Figure 2:
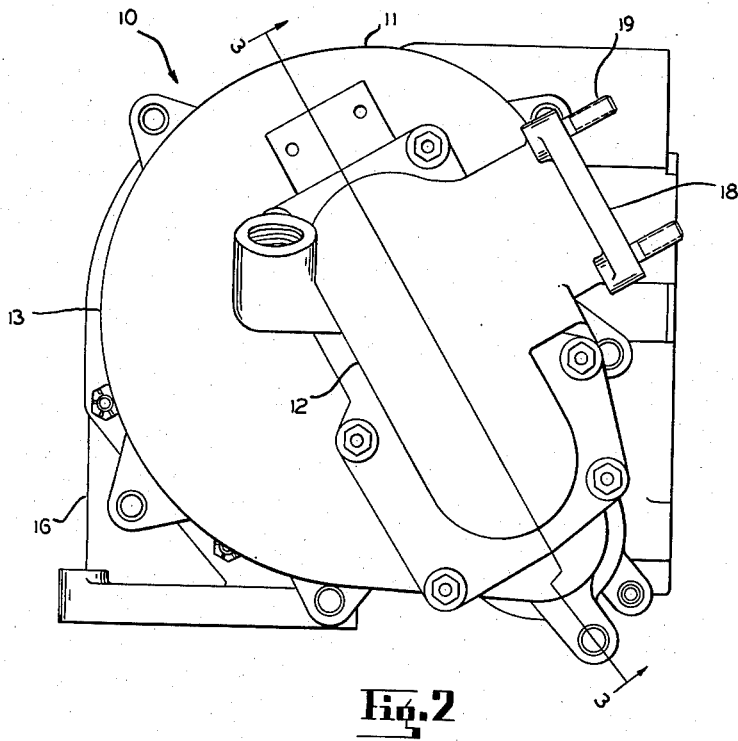
Figure 2 is an end elevational view of the pump shown in Figure 1.

Although the principles of the present invention are of general utility, the present disclosure is made in connection with an aircraft fuel pump indicated generally at 10 and constituting the main fuel pump for the fuel system of a jet engined aircraft. The pump 10 comprises a casing indicated generally at 11 and consisting of a plurality of connected casing or housing parts identified for convenience by the reference numerals 12, 13, 14, 16 and 17, respectively.

The casing section 12 is provided with a mounting pad 18 having a plurality of fastener studs 19 projecting therefrom to facilitate connection of the pump 10 to a suitable conduit leading to a source of fuel supply such as the fuel cell of an aircraft. The housing section 12 further prescribes a pump inlet indicated at 20 and which communicates through an opening 21 with the eye of a centrifugal impeller 22 rotatable in a volute pumping chamber 23 provided by the housing section 13. The centrifugal impeller initially pressurizes the fuel and drives a stream of fuel through a fluid circuit extending through the casing 11 of the pump 10 for further pressurization by positive displacement pumping means in the casing 11 in series-staged relation with the centrifugal impeller 22.

For example, as indicated in the schematic and diagrammatic plumbing diagram of Figure 6, the pump inlet is shown at 20 leading to the centrifugal pumping unit which is given the same number as the centrifugal impeller 22. The fuel is driven through a fluid circuit in the pump 10 to the positive displacement pumping means indicated generally at 24 whereupon the fuel is discharged from the pump outlet 26 to a fuel control unit 27. The fuel control unit 27 constitutes a point of utilization in that it regulates the supply of fuel to the burners 28 of a jet engine. Fuel in excess of the burner requirements is by-passed from the fuel control unit 27 through a by-pass line 29 having a check valve 30 therein to a point interstage the centrifugal impeller 22 and the positive fluid displacement means 24.

Figure 3:
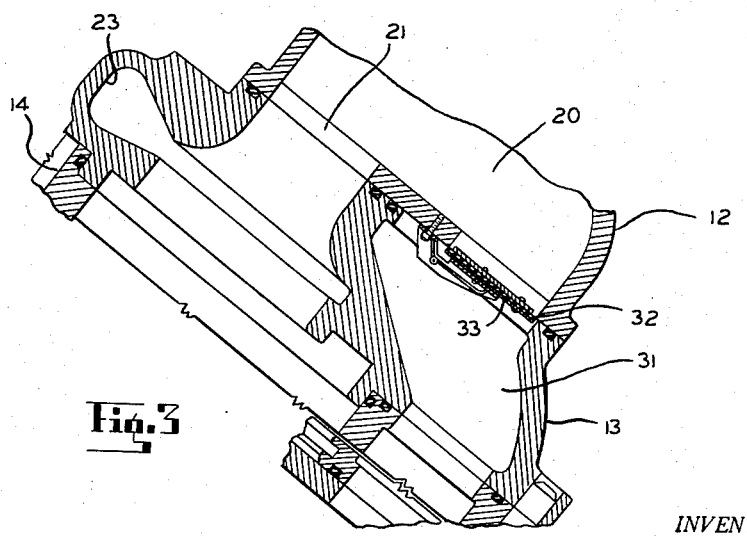
Figure 3 is a fragmentary cross-sectional view taken substantially on line 3—3 with parts removed to show additional details of the hydraulic circuitry in the pump casing.

As is diagrammatically indicated in Figure 6 and as is clearly shown in Figure 3, the casing sections 13 and 14 of the casing 11 have formed therein a by-pass passage 31 communicating with the pump inlet 20 through a valve seat 32 controlled by a spring-biased one-way check or poppet valve 33.

Both the discharge from the centrifugal impeller 22 delivered via the volute pumping chamber 23 and the by-pass passage 31 supply the inlet of the positive fluid displacement means 24. Thus, in the event of failure of the centrifugal pump, the positive displacement means 24 can take a direct suction on the pump inlet 20 via the by-pass passage 31.

Referring now more particularly to Figure 1, it will be noted that the positive displacement fluid pumping means 24 constitute two separate pumping units each consisting of a pair of rotary intermeshing gears rotatable in a pair of overlapping cylindrical bores. Only one of the gear pumps will be described in detail since this will suffice for the purposes of this disclosure. A driver gear is indicated at 34 and meshes as at 36 with a driven gear 37. The casing section 16 has a pair of overlapping bores 38 and 39 forming a pumping chamber for the gears 34 and 37.

Each gear has shaft extensions projecting from opposite gear side faces thereof indicated at 40. On one side of each gear, the shaft extensions 40 are journaled in fixed bushings 41 received in corresponding bores formed in the casing section 16. On the other side of each respective gear, the shaft extensions 40 are journaled in pressure-loaded movable bushings 42.

A driving member 43 is journaled and sealed in the casing section 17 and has a splined driving portion 44 adapted to be connected to a suitable source of power. The driving member is, in turn, splined to the shaft extension of one of the driver gears 34, as well as to a quill shaft 46 extending through the hollow bores formed in the driver gears 34. The quill shaft 46 is splined to the other driver gear 34 and also drives a gear member 47 forming part of a gear train connected in driving relationship with the centrifugal impeller 22 so that all of the pumping units may be driven by a common source of driving power.

Referring now more particularly to Figures 4 and 5, the strainer construction of the present invention will be described. First of all, it will be noted that the casing section 16 is cored to provide a portion of the fluid circuit extending through the pump 10 between the inlet 20 and the outlet 26 and in this respect, the housing section 16 has an opening 48 which is located interstage the centrifugal impeller 22 and the positive fluid displacement means 24. Thus, all fuel passing through the fluid circuit established by the pump 10 passes through the opening 48 and into the cored cavity 49 of the housing section 16.

The housing section 16 is further constructed to provide an enlarged recess or a chamber 50 having generally cylindrical side walls 51 terminating at one end in a throat indicated by the reference numeral 52. Communicating with the other end of the chamber 50 is an outlet leading to the inlet portions of the positive displacement means 24 and more particularly the inlet portions of the gear pumps.

Spaced from but in register with the throat 52 is an opening 53 formed in the housing section 16 to receive therein a strainer cover member 54. The strainer cover member 54 is assembled firmly to the casing section 16 by a plurality of fasteners 56. An annular groove 57 receives an O-ring sealing member 58 for engaging the casing section 16, thereby sealing the cover member 54 in place.

Extending longitudinally from the disk-shaped body portion of the cover member 54 are a plurality of circumferentially spaced support struts 59. The struts 59 alternate with openings 60 and are generally coextensive in longitudinal extent with the spacing dimension between the throat 52 and the end of the casing section 16, thereby to admit the flow of fluid from the hollow cavity 49 into the chamber 50.

At the end of the struts 59 there is formed a support member taking the form of a continuous ring 61 having an annular valve seating surface 62 as well as an annular peripheral recess providing a seating shoulder 63. The ring 61 forms a center inlet for the recess chamber 50.

The outer peripheral edge 64 of the ring 61 is snugly received in the throat 52, thereby insuring that all fluid driven through the fluid circuit in the pump 10 will pass through the valve seat 62 between the cavity 49 and the chamber 50.

The cover member 54 has a central opening 66 receiving a center post 67 which extends longitudinally through the opening provided by the ring 61 and at the axis of the valve seat 62.

The post 67 conveniently comprises a locking bolt and has a nut 68 at one end thereof shouldering against the cover member 54.

At the other end of the post 67 extending into the chamber 50, there is provided a threaded portion 69 receiving a locking nut 70 which is turned against an apertured end wall 71 formed on a generally cup-shaped strainer body or cage indicated at 72. The side walls of the strainer body 72 are generally cylindrical in configuration and are indicated at 73. The walls 73 have a plurality of openings 74 formed therein and terminate in an annular edge 76 which is received and seated against the shoulder 63 provided by the ring 61. By tightening the locking nut 70, the cup-shaped strainer body 72 is locked in firm assembly with the cover member 54. It will be noted that the outer diameter of the walls 73 is such that the edge 76 is received between the ring 61 and the walls of the throat 52. Thus, all fluid driven through the fluid circuit in the pump 10 will pass through the ring 61 and through the openings 74 in the perforated wall 73.

Received within the strainer body 72 is a movable filter assembly operable as a valve and normally seated against the valve seat 62 to filter fuel driven through the fluid circuit but lifting in response to abnormal pressure forces in the fluid circuit to insure a continuous flow of fuel to the pump outlet.

The filter assembly comprises a pair of inner and outer concentrically disposed sleeve-like screens 77 and 78, respectively. At one end of the screens 77 and 78 there is provided a support ring 79 which serves to rigidify the screens 77 and 78 and also provides a valve head or valve seating ring having a seating surface 80 for engaging and seating against the valve seat 62.

At the other end of the screens 77 and 78, a generally circular support structure is provided by upper and lower disk members 81 and 82, respectively, each flanged as at 83 and 84 to provide an annular recess receiving and seating the end edge portions of the screens 77 and 78. It will be understood that the screens 77 and 78 together with the ring member 79 and the support members 81 and 82 may be silver soldered or otherwise joined to insure a firm assembly of the filter assembly components.

The support members 81 and 82 have central openings formed therein as at 86 for sliding movement on the center post 67. Moreover, the flange 83 on the support member 81 slidably engages the walls 73 of the strainer body 72.

A continuous biasing means in the form of a coil spring 87 is bottomed at one end against the end wall 71 and at the other end against the support member 81, thereby to normally bias the filter assembly into seated relationship on the valve seat 62.

The entire filter assembly is movable within the strainer body 72 within the limits prescribed by an annular shoulder 88 formed in the walls 73 to engage against the support member 81.

In normal operation, therefore, all fuel driven through the fluid circuit extending through the pump 10 will be filtered through the foraminous mesh of the screens 77 and 78, however, if abnormal pressure forces are developed in the fluid circuit because of clogging of the filter assembly, such pressure forces will act upon the filter assembly to move the filter assembly as a valve against the continuous biasing force of the coil spring 87 whereupon the ring member 79 will be separated from the valve seat 62 as shown in Figure 5.

For the sake of correlating the structure illustrated in Figures 4 and 5 with the schematic plumbing diagram of Figure 6, the check valve in the by-pass line is indicated by the reference numeral 79 corresponding to the ring member 79 illustrated in Figures 4 and 5 and the symbolic representation of the filter is indicated by the reference numeral 77, corresponding to the number applied to one of the screens. It will be appreciated that the lifting of the valve-like filter assembly operates in the manner of a by-pass since the flow of fluid will then go directly through the opening 74 in the walls 73 of the strainer body 72. There is thus insured an adequate flow of fluid through the fluid circuit even when the filter is clogged.

According to the provisions of the present invention, therefore, not only may the centrifugal pumping means be by-passed, but the filter structure can also be by-passed. The operator of the aircraft is thus provided with maximum safety features under emergency conditions and with all of the advantages of a series-staged pump with a filtered flow during normal operating conditions.

Although various minor structural modifications might be suggested by those versed in the art, it should be understood that we wish to embody within the scope of the patent warranted hereon all such modifications as reasonably and properly come within the scope of our contribution to the art.

We claim as our invention:

1. A pump comprising a casing having an inlet and an outlet, a centrifugal pumping unit in said casing at said inlet, a strainer in said casing through which the discharge of said centrifugal pumping unit is directed, a positive displacement pumping unit in said casing receiving the fluid pumped by said centrifugal pumping unit after it has passed through said strainer and further pressurizing the fluid for delivery through said outlet, said strainer including a strainer casing having an enlarged recess formed therein, a support member attached to said strainer casing and providing an annular ring portion forming a center inlet communicating with the discharge of the centrifugal pumping unit and a seating surface surrounding said center inlet, a cup-shaped cage having an end wall spaced oppositely from said center inlet and having side wall portions bottomed against said ring portion, a locking bolt extending through the center of said cage engaging said support member and said end wall to lock said cage in firm assembly with said support member, the side wall portions of said cage having a plurality of openings therein for communicating fluid in series flow relation to the positive displacement pumping unit, and a cylindrical foraminous filter sleeve in said cage movable as a valve and having a valve seating ring at one end engaging and seating against said seating surface and having a support member closing the opposite end thereof, said support member having an opening formed therein through which said locking bolt passes, and a continuous biasing means between said wall member and said end wall to normally bias said filter sleeve into seated position, but yielding in response to pressure forces to by-pass the filter sleeve, thereby insuring flow of fluid through the pump.

2. In an aircraft fuel pump, a casing having an inlet and an outlet, centrifugal fluid displacement means in said casing for driving a stream of fuel through a fluid circuit extending between said inlet and said outlet, a valve seat in said casing forming a part of said fluid circuit downstream of said centrifugal fluid displacement means, positive displacement means in said casing downstream in said fluid stream of said valve seat for driving the stream of fuel initially pressurized by said centrifugal fluid displacement means to the outlet, a foraminous strainer seated in said valve seat for straining the fuel, biasing means engaged against said strainer pre-loading said strainer against said seat to insure that all fuel is normally strained, but yielding to abnormal pressures in said fluid circuit to lift said strainer for insuring a flow of fuel to said outlet even when the strainer clogs.

3. In an aircraft fuel pump, a casing having an inlet and an outlet, series-staged fluid displacement means in said casing for driving a stream of fuel through a fluid circuit in said casing extending from said inlet to said outlet comprising a centrifugal impeller receiving fluid from the inlet and a positive displacement impeller delivering fluid through the outlet, a circular valve seat in said casing forming a part of said fluid circuit interstage said series-staged fluid displacement means, a cup-shaped strainer body surrounding said valve seat and receiving all of the fuel passing therethrough, said strainer body having a plurality of openings formed therein through which fuel driven in said fluid circuit passes, a cup-shaped strainer filter movably mounted for reciprocation inside of said strainer body, biasing means operatively interposed between said strainer body and said filter and normally biasing said filter into seating relation against said valve seat, said filter having foraminous walls for normally filtering all fuel passing through said valve seat and said strainer body but moving in said strainer body away from said valve seat and against said biasing means in response to abnormal pressures in said fluid circuit, thereby to insure a flow of fluid in said fluid circuit even when the filter is clogged.

4. In an aircraft fuel pump, a casing having an inlet and an outlet, series-staged centrifugal and positive displacement fluid displacement means in said casing for driving a stream of fuel through a fluid circuit in said casing extending from said inlet to said outlet, a by-pass passage from said inlet around one of said series-staged fluid displacement means to another of said fluid displacement means, a one-way poppet valve in said by-pass passage, whereby said other pump may draw suction upon said inlet directly through said by-pass passage, a valve seat in said fluid circuit upstream of said other fluid displacement means, a cup-shaped strainer body surrounding said valve seat and receiving all of the fuel passing therethrough, said strainer body having a plurality of openings formed therein through which fuel driven in said fluid circuit passes, a cup-shaped strainer filter movably mounted for reciprocation inside of said strainer body, biasing means operatively interposed between said body and filter and normally biasing said filter into seating relation against said valve seat, said filter having foraminous walls for normally filtering all fuel passing through said valve seat and said strainer body but moving in said strainer body against said biasing means and away from said valve seat in response to abnormal pressures in said fluid circuit, thereby to insure a flow of fluid in said fluid circuit even when the filter is clogged.

5. In an aircraft fuel pump, a casing having an inlet and an outlet, and a fluid circuit extending therebetween, fluid displacement means in said circuit including a centrifugal impeller for driving a stream of fuel from said inlet and a positive displacement impeller in series therewith to drive the fluid to said outlet, and a strainer in said circuit between said impellers comprising a valve seat, a strainer body at said valve seat having perforate walls through which fuel is driven, and a movable spring biased filter guided for movement in said body into seating relation against said valve seat, thereby to normally filter all fuel driven through said circuit but said filter lifting away from said seat in response to abnormal pressure forces in the circuit to insure a continuous flow of fuel between the filter and the seat from the inlet to the outlet even when the filter is clogged.

6. An aircraft fuel pump comprising a casing having an inlet, a volute pumping chamber formed in said casing communicating with said inlet, a centrifugal impeller rotatable in said volute pumping chamber to initially pressurize fuel supplied thereto through said inlet, means forming a second pumping chamber in said casing having an outlet, positive displacement pumping means in said second pumping chamber for delivering fluid through said outlet to a point of utilization, and passage means in said casing between said inlet and said outlet for series staging said centrifugal impeller and said positive displacement pumping means, said passage means including a valved by-pass passage around said volute pumping chamber, whereby an emergency by-pass can be effected between said inlet and said positive displacement pumping means in the event of failure of said centrifugal impeller, said passage means further including a cored cavity through which all of the fuel received in said inlet is passed, and a filter in said cavity to filter all of the fuel passing through said pump.

7. An aircraft fuel pump comprising a casing having an inlet, a volute pumping chamber formed in said casing communicating with said inlet, a centrifugal impeller rotatable in said volute pumping chamber to initially pressurize fuel supplied thereto through said inlet, means forming a second pumping chamber in said casing having an outlet, positive displacement pumping means in said second pumping chamber for delivering fluid through said outlet to a point of utilization, and passage means in said casing between said inlet and said outlet for series staging said centrifugal impeller and said positive displacement pumping means, said passage means including a valved by-pass passage around said volute pumping chamber, whereby an emergency by-pass can be effected between said inlet and said positive displacement pumping means in the event of failure of said centrifugal impeller, said passage means further including a cored cavity through which all of the fuel received in said inlet is passed, a spring-biased filter in said cavity normally filtering all of the fuel passing through said pump but movable in response to clogging of the filter to effect an emergency by-pass through said cored cavity between said inlet and said positive displacement pumping means.

References Cited in the file of this patent

UNITED STATES PATENTS

| Number | Name | Date |
|---|---|---|
| 1,506,967 | Bosworth | Sept. 2, 1924 |
| 2,286,816 | Kishline | June 16, 1942 |
| 2,287,344 | Easton et al. | June 23, 1942 |
| 2,455,571 | Edwards | Dec. 7, 1948 |
| 2,562,361 | Kasten | July 31, 1951 |
| 2,688,925 | Thoren et al. | Sept. 14, 1954 |
| 2,713,244 | Chandler | July 19, 1955 |
| 2,725,932 | Ballantyne et al. | Dec. 6, 1955 |
| 2,726,604 | Aspelin et al. | Dec. 13, 1955 |
| 2,748,947 | Jay | June 5, 1956 |
| 2,761,387 | Gaubatz | Sept. 4, 1956 |
| 2,765,746 | Omon | Oct. 9, 1956 |
| 2,812,715 | Redding et al. | Nov. 12, 1957 |